United States Patent [19]
Battle

[11] 3,836,183
[45] Sept. 17, 1974

[54] FLANGE JOINT
[75] Inventor: Billy J. Battle, Birmingham, Ala.
[73] Assignee: United States Pike and Foundry Company, Birmingham, Ala.
[22] Filed: Mar. 7, 1973
[21] Appl. No.: 338,804

Related U.S. Application Data
[63] Continuation of Ser. No. 125,045, March 17, 1971, abandoned.

[52] U.S. Cl................. 285/363, 277/211, 285/414
[51] Int. Cl.......................... F16l 23/00, F16j 15/00
[58] Field of Search .......... 207/207, 208, 209, 211; 285/363, 364, 365, 366, 367, 368, DIG. 11

[56] References Cited
UNITED STATES PATENTS
126,624   5/1872   Coffee ............................... 277/211
301,512   7/1884   Mixer............................... 285/363 X
920,502   5/1909   Tompkins ....................... 285/363 X
1,802,766 4/1931   Kerr................................ 285/363 X
1,819,036 8/1931   Oberhuber......................... 285/363

FOREIGN PATENTS OR APPLICATIONS
342,721   7/1904   France............................... 277/211
596,311   8/1925   France............................... 277/211

Primary Examiner—Samuel B. Rothberg
Attorney, Agent, or Firm—James W. Grace

[57] ABSTRACT

A flanged joint with a ribbed resilient gasket effecting a fluid tight seal between the faces of two flanges and also effecting an axial seal between a flange and an annular member where the flange is detachably secured to the annular member.

5 Claims, 5 Drawing Figures

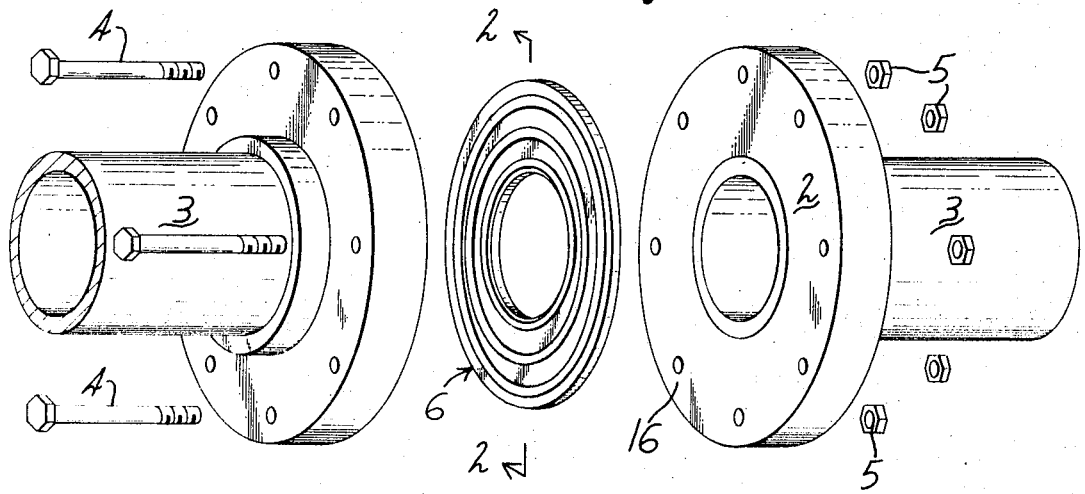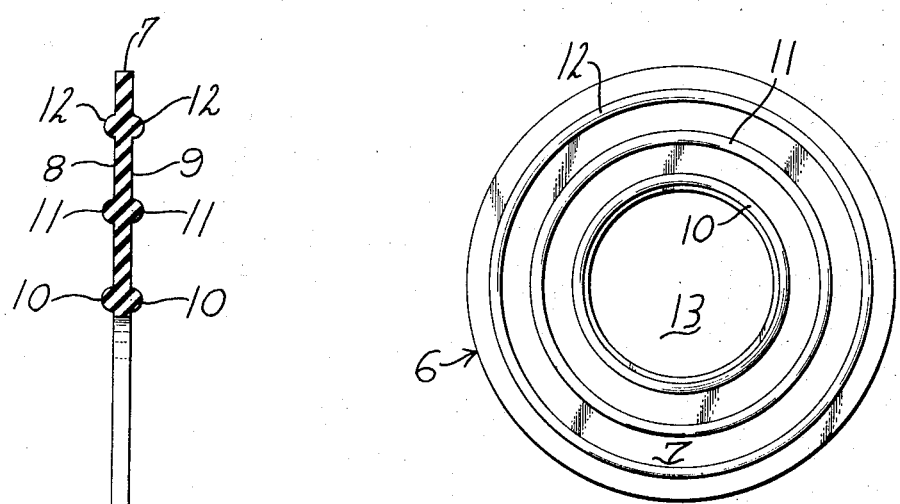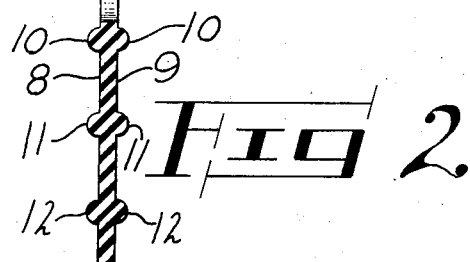

INVENTOR.
BILLY J. BATTLE

FLANGE JOINT

This is a continuation of application Ser. No. 125,045, filed Mar. 17, 1971, now abandoned.

DESCRIPTION OF PRIOR ART

Previously sealing between metal flanges detachably secured to annular members such as is the case of flanged pipe for conveying of water under pressure has presented two basic problem areas, one, the seal between the flanges, and two, the seal between a flange and an annular member to which it is attached. The problem of sealing between flanges is not unique to detachably secured flanges as it exists in systems where flanges are secured in a relatively permanent manner. Effecting a seal between metal flanges has long been accomplished utilizing a gasket cut from a sheet of rubber or other resilient material resulting in a flat annular ring with a central orifice of about the same diameter as the opening of the annular members being joined. In order to achieve a reliable seal utilizing such a gasket the flanges being joined must be precisely made, must be protected from deflection, bolts must be extremely tight and internal pressures limited to the ability of the gasket to seal. Sealing between a flange and an annular member to which the flange is detachably secured has never been accomplished satisfactorily by mere metal to metal contact of the coacting tapered pipe threads of the flange and pipe end and has required the use of additional sealers. Using my invention, flanges may be manufactured to less precise tolerances, greater deflection of the flanges permitted, bolt torque may be reduced and internal fluid pressure increased, all without an increase in the cost of manufacturing the gasket.

SUMMARY OF THE INVENTION

It is, therefore, an object of my invention to provide a flanged joint that will effect a seal between flange faces that are not maintained precisely parallel and where small sealing surface imperfactions exist.

It is also an object of my invention to provide a seal between detachably secured flanges and the annular members to which the flanges are secured.

It is another object of my invention to provide a means of sealing that will allow existing flange designs to be utilized at higher pressures.

My invention achieves these objects by providing a cooperating pair of flanges attached to pipe or other annular members with a gasket disposed between the flanges, and wherein the gasket comprises a flat annular ring with a central opening of about the same size as the internal diameter of the pipe and having three concentric raised ribs on each face of the gasket. In the event one or both of said flanges is threaded or otherwise detachably secured to the respective pipe end, the radially innermost rib on the adjoining gasket face is designed to be equal to or less than the outer diameter of the pipe but greater than its inner diameter.

DESCRIPTION OF THE DRAWINGS

FIG. 1 is an exploded perspective view of my flanged pipe joint.

FIG. 2 is a cross sectional view taken along line 2—2 of FIG. 1 showing the preferred gasket to be used in my invention.

FIG. 3 is a plan view of the preferred gasket.

DESCRIPTION OF THE PREFERRED EMBODIMENT

Figure 4:
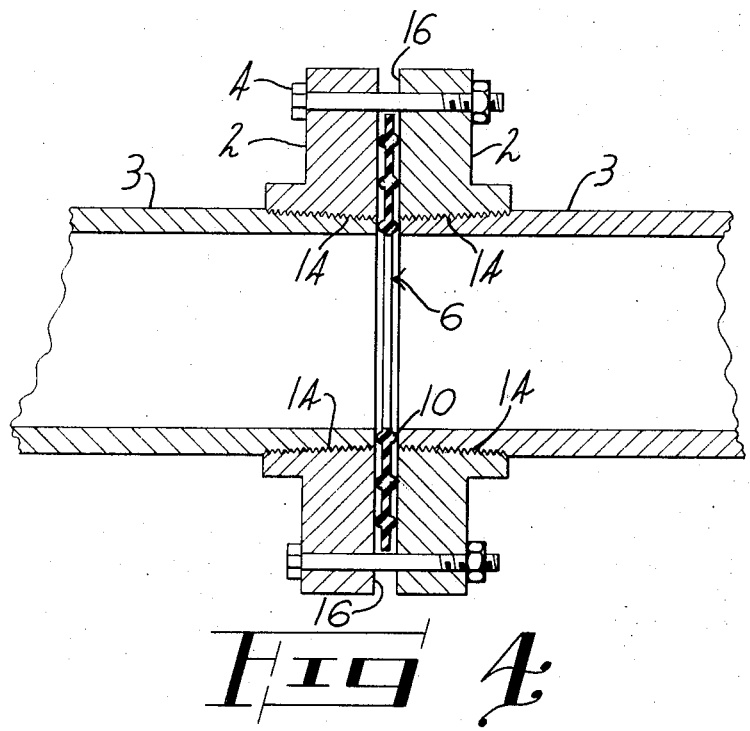
FIG. 4 is a view in partial section showing an assembled flanged joint utilizing my preferred gasket.
Figure 5:
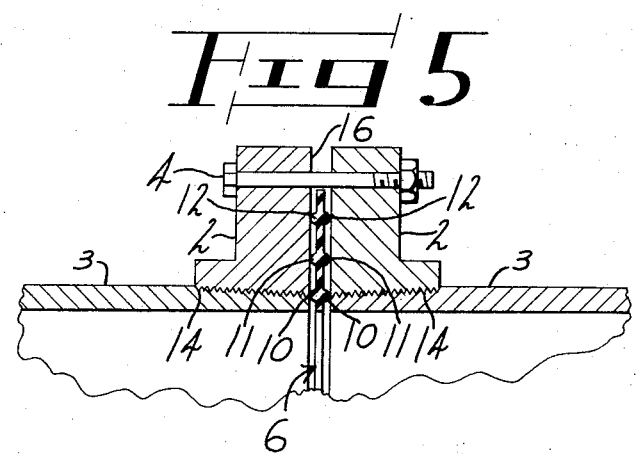
FIG. 5 is a fragmented sectional view showing an alternate embodiment of my invention.

Referring to FIG. 1 there is shown a pair of pipe flanges 2 attached to pipes 3, also bolts 4 and nuts 5 and gasket 6 which is shown in more detail in FIG. 2. Gasket 6 comprises a body portion 7, a face 8 and a face 9. Protruding from each face are innermost ribs 10, intermediate ribs 11 and outermost ribs 12. Ribs 10, 11, and 12 are semicircular in cross section depending from said gasket face 8 and 9 a distance at least equal to one-half the thickness of said body portion 7 with the distance between adjacent ribs being substantially equal. Ribs 10, 11, and 12 form concentric circles about central opening 13. Gasket 6 is of a molded resilient material such as rubber and has an outside diameter slightly less than the distance between any two diametrically opposed bolts 4. For example, a gasket for 8 inch cast iron water pipe will be 0.125 inch thick through the body portion, and each rib is spaced approximately 0.375 inch from the adjacent rib. All gaskets used for purposes of my invention are of 70 ± 5 durometer. In FIG. 4 there is shown an assembled flanged joint of the preferred embodiment wherein flanges 2 are attached to pipes 3 utilizing tapered pipe threads 14 in a manner well known to those skilled in the art. Gasket 6 is disposed between and compressed by the respective opposing end faces 16 of each flange to effect a seal there between when bolts 4 are tightened. As can be seen, rib 10 has a diameter equal to the central opening of gasket 6 plus the thickness of the wall of pipe 3. The central opening of gasket 6 is equal to that of the inner diameter of pipe 3. This will provide for the rib 10 being disposed between the threaded joint formed by threads 14 and the inner diameter of pipe 3. Thus, not only does the innermost rib 10 contribute to providing an effective seal radially, it also prevents leakage under pressure axially along threads 14. With standard flanged pipe joints it has long been the practice to apply a thread sealant having an expoxy to the threads and back of the flange. This is no longer necessary with my invention and if used at all need only be considered a "fail safe" feature, or as necessary to meet certain limited specifications. In FIG. 5 there is shown an alternate embodiment of a flanged joint differing from that shown in FIG. 4 only in that rib 10 of gasket 6 is so constructed to abut pipes 3 and flanges 2 at thread 14. Flanged joints are assembled in a manner well known to those skilled in the art and use of my preferred gasket requires no deviation from said manner.

While I have described only the preferred embodiments of my invention it will be understood that other modifications might be made and changes to details made without departing from the principles of my invention.

I claim:

1. A pipe joint which provides a leakproof passageway at the joint between adjoining pipes for conveying fluids under pressure, comprising in combination a pipe section, a second member and a resilient annular gasket, said pipe section having an end portion of generally cylindrical outer circumference and including an end face at the axially outermost limit of said end portion and a generally circumferential flange fixed thereto and extending radially outward therefrom, said flange having an inner circumferential wall defining an opening substantially equal in size to the outer wall of said end portion, said flange further including a flat sealing face portion, coacting pipe threads formed on said end portion and on said inner wall of said flange for securing said flange to said end portion of said pipe section, said end face of said pipe section and said sealing face of said flange being in substantial alignment in a plane substantially normal to the axis of said pipe section, said second member having a flanged end in substantial axial alignment with said pipe section for conveying fluids therefrom, said flanged end being adjacent to and substantially parallel with the sealing face of said flange, said resilient annular gasket having only one opening and being disposed between said flange of said pipe section and said flanged end of said second member, said gasket having a solid flat body portion comprising a circumferentially continuous disc forming an annular ring with central opening, said body portion having two faces, each said face having three annular alined ribs of semicircular cross section depending outwardly from said faces a distance at least equal to half the thickness of said body portion, said ribs forming concentric circles about said central opening, the middle said rib and outermost said rib being of such a diameter that said middle rib is spaced a distance radially outward from the innermost rib substantially equal to the distance from said middle rib to said outermost rib, and the outside diameter of said gasket being greater than the diameter of said outermost rib said innermost rib being at least substantially the same diameter as said end face, and means for securing said flange and said flange end to one another and compressing said annular gasket whereby a seal is formed radially between the radially opposed faces of the pipe section flange and the flanged end of the second member as well as an axial seal being effected by said radially innermost rib of said gasket to prevent leaking axially through the said means for connecting said flange to the pipe section.

2. A pipe joint as in claim 1 wherein said central opening of the gasket is equal to the inner diameter of said pipe section, and said innermost rib is of substantially the same diameter as said central opening plus the thickness of one wall of said pipe section.

3. A pipe joint which provides a leakproof passageway at the joint between adjoining pipes for conveying fluids under pressure, comprising in combination a pipe section having an end portion of generally cylindrical outer circumference and including an end face at the axially outermost limit of said end portion and a generally circumferential flange fixed thereto and extending radially outward therefrom, said flange having an inner circumferential wall defining an opening substantially equal in size to the outer wall of said end portion, said flange further including a flat sealing face portion, coacting pipe threads formed on said end portion and on said inner wall of said flange for securing said flange to said end portion of said pipe section, said end face of said pipe section and said sealing face of said flange being in substantial alignment in a plane substantially normal to the axis of said pipe section, a second member having a flanged end in substantial axial alignment with said pipe section for conveying fluids therefrom said flanged end being adjacent to and substantially parallel with the sealing face of said flange, a resilient annular gasket having only one opening and being disposed between said flange of said pipe section and said flanged end of said second member, said gasket having a solid flat body portion comprising a circumferentially continuous disc forming an annular ring with central opening, said body portion having two faces, one said face having an annular rib of semicircular cross section depending outwardly from said face a distance at least equal to half the thickness of said body portion, and said one said face being positioned against said end face of said pipe section, said rib forming a concentric circle about said central opening and having a diameter greater than said central opening but no greater than said outer wall of said pipe section, said innermost rib being at least substantially the same diameter as said end face, and means for securing said flange and flange end to one another and compressing said annular gasket whereby a seal is formed radially between the radially opposed faces of the pipe section flange and the flanged end of the second member as well as an axial seal being effected by said rib of said gasket to prevent leaking axially through the said means for connecting said flange to the pipe section.

4. A pipe joint as in claim 3 wherein said means for securing said flange to said end portion of said pipe section comprises coacting pipe threads formed on the outer wall of said end portion and on said inner wall of said flange and wherein said rib is of substantially the same diameter as the coacting pipe threads.

5. A pipe joint as in claim 3 wherein said rib is of a diameter substantially the same diameter as said central opening plus the thickness of one wall of said pipe section.

* * * * *

UNITED STATES PATENT OFFICE
CERTIFICATE OF CORRECTION

Patent No. 3,836,183          Dated September 17, 1974

Inventor(s) Billy J. Battle

It is certified that error appears in the above-identified patent and that said Letters Patent are hereby corrected as shown below:

The name of the Assignee should be corrected to read:

--United States Pipe and Foundry Company, Birmingham, Alabama--.

Signed and sealed this 3rd day of December 1974.

(SEAL)
Attest:

McCOY M. GIBSON JR.
Attesting Officer

C. MARSHALL DANN
Commissioner of Patents